(12) United States Patent
Obinata et al.

(10) Patent No.: US 6,526,848 B2
(45) Date of Patent: Mar. 4, 2003

(54) VEHICLE TRANSMISSION

(75) Inventors: Jiro Obinata, Wako (JP); Toshiaki Maeda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,951

(22) Filed: Aug. 31, 2001

(65) Prior Publication Data

US 2002/0029655 A1 Mar. 14, 2002

(30) Foreign Application Priority Data

Sep. 8, 2000 (JP) ........................................ 2000-273249

(51) Int. Cl.⁷ ............................................. F16H 57/02
(52) U.S. Cl. ................. 74/606 R; 123/90.33; 192/87.13; 475/83
(58) Field of Search .................. 74/606 R, 605; 192/87.13; 123/90.31, 90.33; 475/83; 60/487

(56) References Cited

U.S. PATENT DOCUMENTS

| | | | | |
|---|---|---|---|---|
| 5,890,575 A | * | 4/1999 | Ohashi et al. | 192/87.13 |
| 5,934,234 A | * | 8/1999 | Shichinohe et al. | 123/90.31 |
| 6,231,466 B1 | * | 5/2001 | Thoma et al. | 475/83 |
| 6,336,379 B1 | * | 1/2002 | Massel | 74/730.1 |
| 6,358,175 B1 | * | 3/2002 | Schreier et al. | 475/83 |
| 2001/0027651 A1 | * | 10/2001 | Hauser et al. | 60/487 |
| 2002/0017159 A1 | * | 2/2002 | Hayabuchi et al. | 74/606 R |
| 2002/0043128 A1 | * | 4/2002 | Cooper | 74/606 R |
| 2002/0121261 A1 | * | 9/2002 | Shinoda et al. | 123/196 R |

FOREIGN PATENT DOCUMENTS

| | | | | |
|---|---|---|---|---|
| EP | 0376169 | * | 7/1990 | 74/606 R |
| EP | 1186803 A2 | * | 3/2002 | 74/606 R |
| JP | 54-102457 | * | 8/1979 | 74/606 R |
| JP | 61-84475 | * | 4/1986 | 74/606 R |
| JP | 61-157873 | * | 7/1986 | 74/606 R |
| JP | 63-83461 | * | 4/1988 | 74/606 R |
| JP | 04-331852 | | 11/1992 | |

* cited by examiner

Primary Examiner—Vinh T. Luong
(74) Attorney, Agent, or Firm—Armstrong, Westerman & Hattori, LLP

(57) ABSTRACT

With regard to an automatic transmission in which an oil passage is formed by interposing a separator plate between a torque converter case and a valve body, a housing of a bearing that supports a counter shaft is press-fitted in a recess of the torque converter case, the edge of the separator plate abuts the outer periphery of the housing, and a notch formed on the valve body superimposed on the separator plate is in contact with the end face of the housing, thereby preventing the bearing from falling out. When supporting the bearing in the recess of the torque converter case, the present invention enables the bearing having a large axial dimension to be supported without deepening the above-mentioned recess.

7 Claims, 7 Drawing Sheets

VEHICLE TRANSMISSION

BACKGROUND OF THE INVENTION

1. Field of the Invention

The present invention relates to a vehicle transmission in which an oil passage is formed by interposing a separator plate between a torque converter case and a valve body, a bearing that supports a shaft is press-fitted in a recess of the torque converter case, and a housing of the bearing is prevented from falling out.

2. The Related Art

An automatic transmission includes hydraulic units such as a hydraulic clutch, a hydraulic brake and a torque converter. Various types of valve that control the operation of these units are each housed within a valve body mounted in the torque converter case with a separator plate interposed between the valve body and the torque converter. By placing the separator plate between the torque converter case and the valve body in this way, it is possible to form oil passages between the separator plate and oil channels that are formed on the surfaces of the valve body and the torque converter case.

As shown in FIG. 7, an end of a shaft 01 of an automatic transmission is supported by a bearing 03 that is press-fitted in a recess 02a formed in a torque converter case 02. A housing 03a of the bearing 03 is prevented from falling out because it is being held in by a separator plate 04 that is superimposed on the torque converter case 02. Such a conventional fixing structure for a bearing is known in Japanese Patent Application Laid-open No. 4-331852.

Increasing the capacity of the bearing 03 that supports the shaft 01 of the automatic transmission results in an increase in the axial dimension or the radial dimension of the bearing 03. It is therefore necessary to increase the diameter or the depth of the recess 02a that houses the bearing 03, which causes the problem that the dimensions of the automatic transmission might increase.

The present invention has been carried out in view of the above-mentioned circumstances and it is an object of the present invention to enable a bearing having a large axial dimension to be supported without deepening the above-mentioned recess of the torque converter case when supporting the bearing in the recess.

SUMMARY OF THE INVENTION

In order to achieve the above-mentioned object, in accordance with the present invention, there is proposed a vehicle transmission in which an oil passage is formed by interposing a separator plate between a torque converter case and a valve body, a bearing that supports a shaft is press-fitted in a recess of the torque converter case, and a housing of the bearing is prevented from falling out, wherein the edge of the separator plate abuts the outer periphery of the housing of the bearing, and a notch formed on the valve body superimposed on the separator plate is in contact with the end face of the housing of the bearing.

In accordance with the above-mentioned arrangement, when the bearing having a large axial dimension is press-fitted in the recess of the torque converter case, even if the housing of the bearing protrudes from the recess, since the edge of the separator plate is in contact with the outer periphery of the housing of the bearing and the notch formed on the valve body superimposed on the separator plate is in contact with the end face of the housing of the bearing, the valve body can reliably prevent the bearing from falling out while forming the oil passage by interposing the separator plate between the torque converter case and the valve body.

BRIEF DESCRIPTION OF THE DRAWINGS

Modes for carrying out the present invention are described below by reference to an embodiment of the present invention shown in the attached drawings.

FIG. 1 is a skeleton diagram showing a four parallel shaft type automatic transmission.

FIG. 2 is a map showing the positions of FIGS. 3 and 4.

FIG. 3 is a detailed diagram of section A in FIG. 2.

FIG. 4 is a detailed diagram of section B in FIG. 2.

FIG. 5 is a magnified diagram of the essential part of FIGS. 3 and 4.

FIG. 6 is a view from a line 6—6 in FIG. 5.

DETAILED DESCRIPTION OF THE PREFERRED EMBODIMENTS

Figure 1:
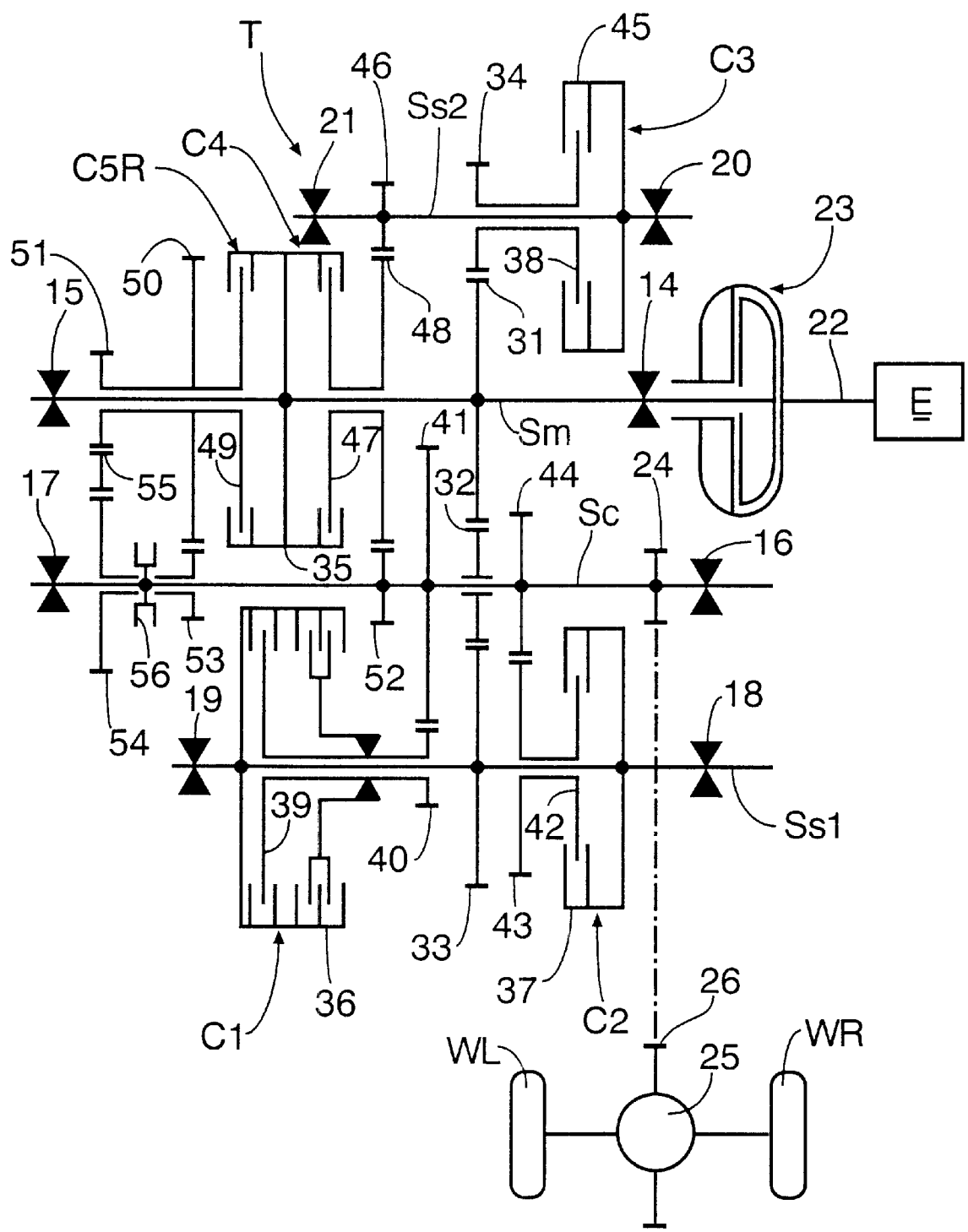
FIGS. 1 to 6 illustrate one embodiment of the present invention.
Figure 2:
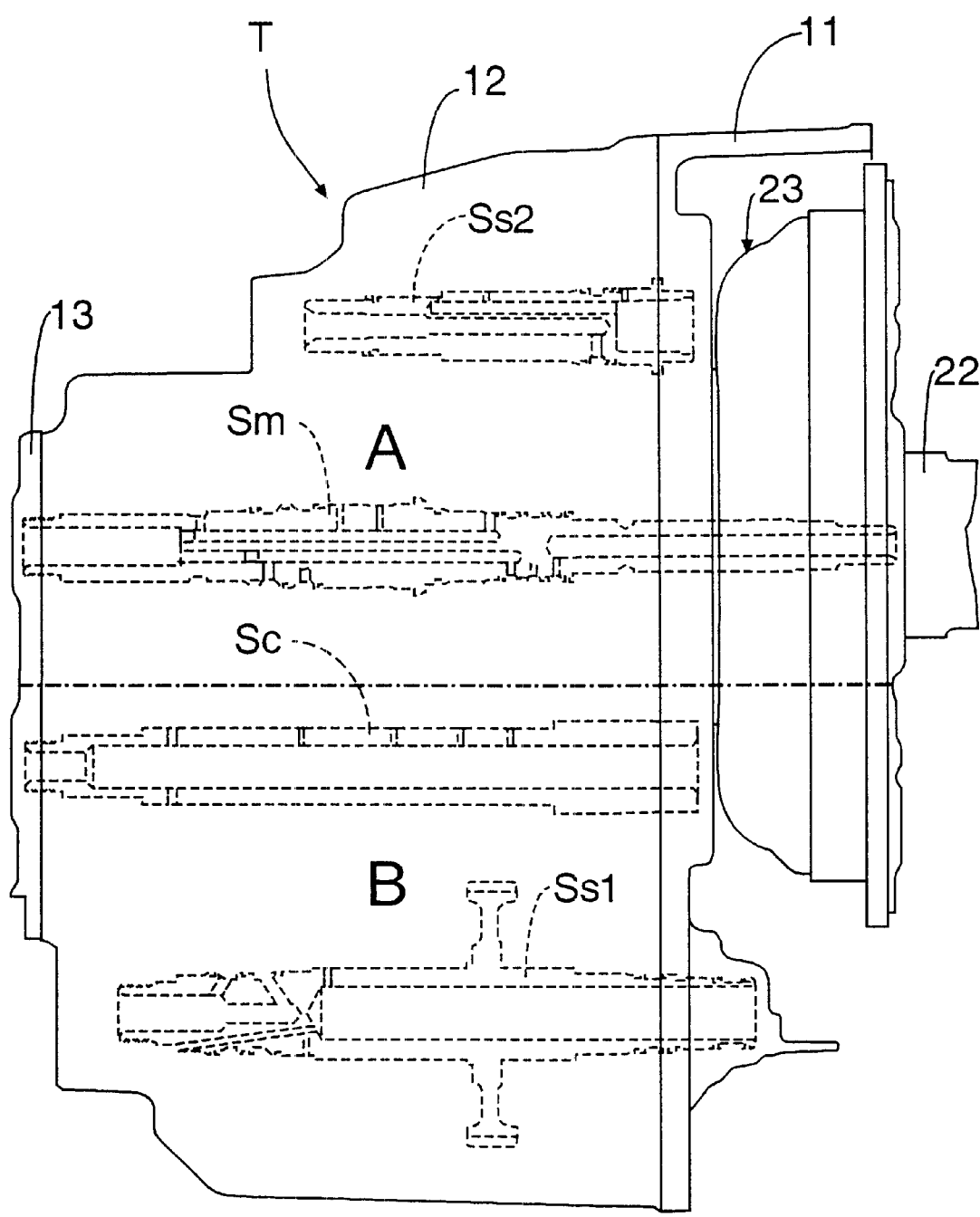
Figure 3:
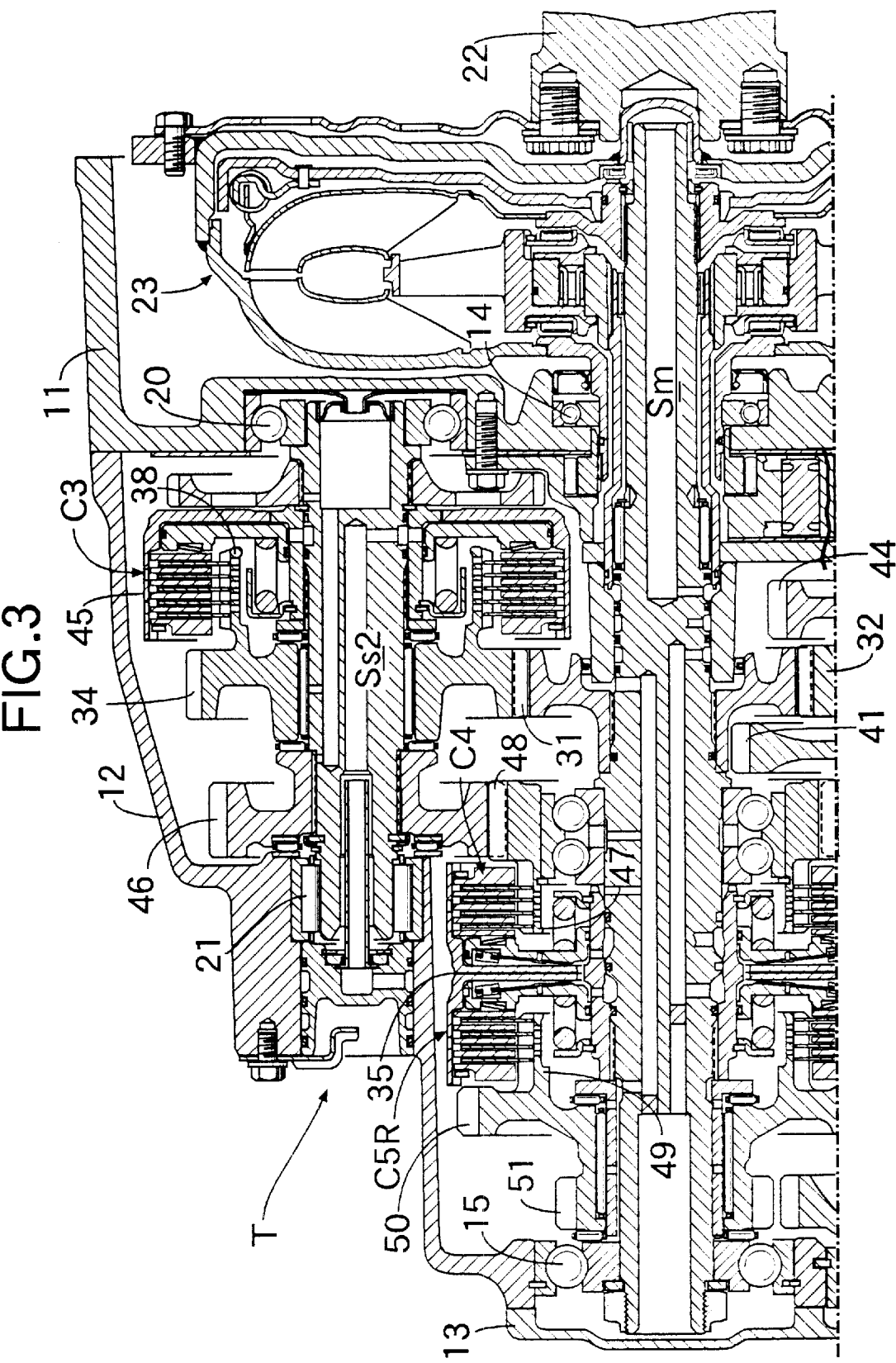
Figure 4:
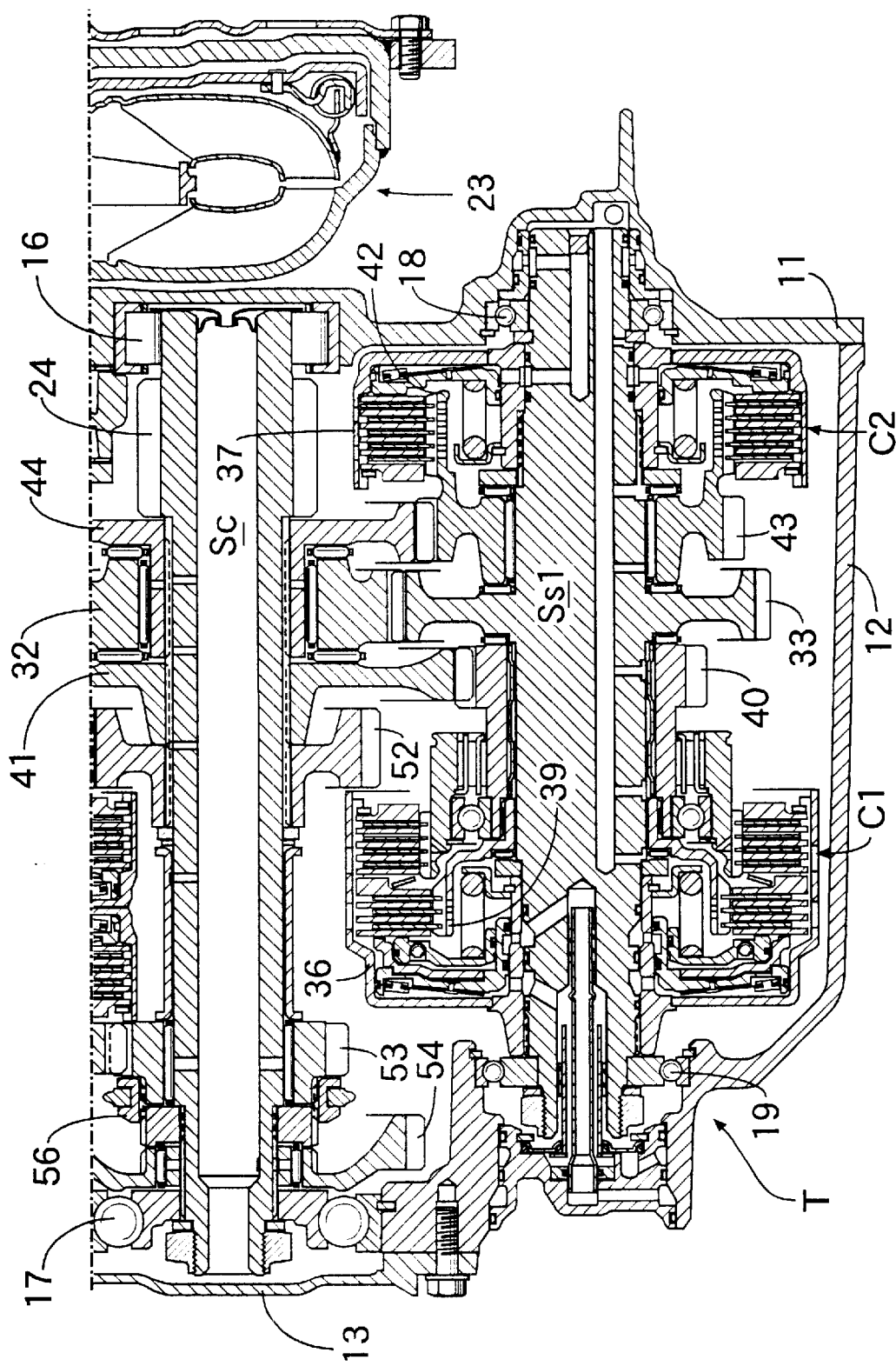

As shown in FIGS. 1 to 4, the outer periphery of a four parallel shaft type automatic transmission T connected to the left-hand side face of an engine E comprises a torque converter case 11, a transmission case 12 and a case cover 13. The torque converter case 11 and the transmission case 12 support a main shaft Sm via ball bearings 14 and 15, a counter shaft Sc via a roller bearing 16 and a ball bearing 17, a first sub-shaft Ss1 via ball bearings 18 and 19, and a second sub-shaft Ss2 via a ball bearing 20 and a roller bearing 21. The main shaft Sm is connected to a crankshaft 22 of the engine E via a torque converter 23. A final drive gear 24 integral with the counter shaft Sc is meshed with a final driven gear 26 fixed on the outer periphery of a differential gear box 25 so as to drive right and left driven wheels WR and WL.

In order to establish a first speed gear shift stage to a fifth speed gear shift stage and a reverse gear shift stage by transmitting the rotation of the main shaft Sm to the counter shaft Sc at the respective gear ratios, a first speed clutch C1 and a second speed clutch C2 are provided on the first sub-shaft Ss1, a third speed clutch C3 is provided on the second sub-shaft Ss2, and a fourth speed clutch C4 and a fifth speed—reverse clutch C5R are provided on the main shaft Sm. A sub-shaft drive first gear 31 integral with the main shaft Sm is meshed with a sub-shaft drive second gear 32 supported on the counter shaft Sc in a relatively rotatable manner. This sub-shaft drive second gear 32 is meshed with a sub-shaft drive third gear 33 integral with the first sub-shaft Ss1. The above-mentioned sub-shaft drive first gear 31 is meshed with a sub-shaft drive fourth gear 34 supported on the second sub-shaft Ss2 in a relatively rotatable manner.

Even when the first speed clutch C1 to the fifth speed—reverse clutch C5R are in a disengaged state, each of the parts explained below always rotates as a result of being operable in association with rotation of the main shaft Sm. That is to say, the sub-shaft drive first gear 31 integral with the main shaft Sm and a clutch outer 35 integral with the main shaft Sm, the clutch outer 35 being common to both the fourth speed clutch C4 and the fifth speed—reverse clutch C5R, always rotate, and the sub-shaft drive second gear 32 of the counter shaft Sc that is meshed with the sub-shaft drive first gear 31 of the main sub-shaft Sm always rotates. The first sub-shaft Ss1 having the integral sub-shaft drive third gear 33 meshed with the above-mentioned sub-shaft drive second gear 32 always rotates and the clutch outers 36 and 37 of the first speed clutch C1 and the second speed clutch C2 provided on this first sub-shaft Ss1 also always rotate. The sub-shaft drive fourth gear 34 supported on the second sub-shaft Ss2 in a relatively rotatable manner and meshed with the sub-shaft drive first gear 31 and a clutch inner 38 of the third speed clutch C3 connected integrally to this sub-shaft drive fourth gear 34 also always rotate.

A first sub first speed gear 40 integral with a clutch inner 39 of the first speed clutch C1 provided on the first sub-shaft Ss1 is meshed with a counter first speed gear 41 integral with the counter shaft Sc. A first sub second speed gear 43 integral with a clutch inner 42 of the second speed clutch C2 provided on the first sub-shaft Ss1 is meshed with a counter second speed gear 44 integral with the counter shaft Sc. A clutch outer 45 of the third speed clutch C3 and a second sub third speed gear 46 are integrally provided on the second sub-shaft Ss2. A main third speed—fourth speed gear 48 integral with a clutch inner 47 of the fourth speed clutch C4 provided on the main shaft Sm is meshed with the above-mentioned second sub third speed gear 46 integral with the second sub-shaft Ss2. A main fifth speed gear 50 and a main reverse gear 51 are provided integrally with a clutch inner 49 of the fifth speed—reverse clutch C5R provided on the main shaft Sm.

A counter third speed—fourth speed gear 52 integral with the counter shaft Sc is meshed with the above-mentioned main third speed—fourth speed gear 48. A counter fifth speed gear 53 and a counter reverse gear 54 are supported on the counter shaft Sc in a relatively rotatable manner, the counter fifth speed gear 53 is meshed with the above-mentioned main fifth speed gear 50, and the counter reverse gear 54 is meshed with the above-mentioned main reverse gear 51 via a reverse idle gear 55 (see FIG. 1). The counter fifth speed gear 53 and the counter reverse gear 54 on the counter shaft Sc can be selectively coupled to the counter shaft Sc by means of a chamfer 56.

When the first speed clutch C1 is engaged so as to establish a first speed gear shift stage, the rotation of the main shaft Sm is transmitted to the driven wheels WR and WL through the sub-shaft drive first gear 31, then the sub-shaft drive second gear 32, the sub-shaft drive third gear 33, the first sub-shaft Ss1, the clutch outer 36 and the clutch inner 39 of the first speed clutch C1, the first sub first speed gear 40, the counter first speed gear 41, the counter shaft Sc, the final drive gear 24, the final driven gear 26 and the differential gear box 25.

When the second speed clutch C2 is engaged so as to establish a second speed gear shift stage, the rotation of the main shaft Sm is transmitted to the driven wheels WR and WL through the sub-shaft drive first gear 31, then the sub-shaft drive second gear 32, the sub-shaft drive third gear 33, the first sub-shaft Ss1, the clutch outer 37 and the clutch inner 42 of the second speed clutch C2, the first sub second speed gear 43, the counter second speed gear 44, the counter shaft Sc, the final drive gear 24, the final driven gear 26 and the differential gear box 25.

When the third speed clutch C3 is engaged so as to establish a third speed gear shift stage, the rotation of the main shaft Sm is transmitted to the driven wheels WR and WL through the sub-shaft drive first gear 31, then the sub-shaft drive fourth gear 34, the clutch inner 38 and the clutch outer 45 of the third speed clutch C3, the second sub-shaft Ss2, the second sub third speed gear 46, the main third speed—fourth speed gear 48, the counter third speed—fourth speed gear 52, the counter shaft Sc, the final drive gear 24, the final driven gear 26 and the differential gear box 25.

When the fourth speed clutch C4 is engaged so as to establish a fourth speed gear shift stage, the rotation of the main shaft Sm is transmitted to the driven wheels WR and WL through the clutch outer 35 and the clutch inner 47 of the fourth speed clutch C4, the main third speed—fourth speed gear 48, the counter third speed—fourth speed gear 52, the counter shaft Sc, the final drive gear 24, the final driven gear 26 and the differential gear box 25.

When the fifth speed—reverse clutch C5R is engaged so as to establish a fifth speed gear shift stage in a state in which the counter fifth speed gear 53 is coupled to the counter shaft Sc by means of the chamfer 56, the rotation of the main shaft Sm is transmitted to the driven wheels WR and WL through the clutch outer 35 and the clutch inner 49 of the fifth speed—reverse clutch C5R, the main fifth speed gear 50, the counter fifth speed gear 53, the counter shaft Sc, the final drive gear 24, the final driven gear 26 and the differential gear box 25.

When the fifth speed—reverse clutch C5R is engaged so as to establish a reverse gear shift stage in a state in which the counter reverse gear 54 is coupled to the counter shaft Sc by means of the chamfer 56, the rotation of the main shaft Sm is transmitted to the driven wheels WR and WL through the clutch outer 35 and the clutch inner 49 of the fifth speed—reverse clutch C5R, the main reverse gear 51, the reverse idle gear 55, the counter reverse gear 54, the counter shaft Sc, the final drive gear 24, the final driven gear 26 and the differential gear box 25.

Figure 5:
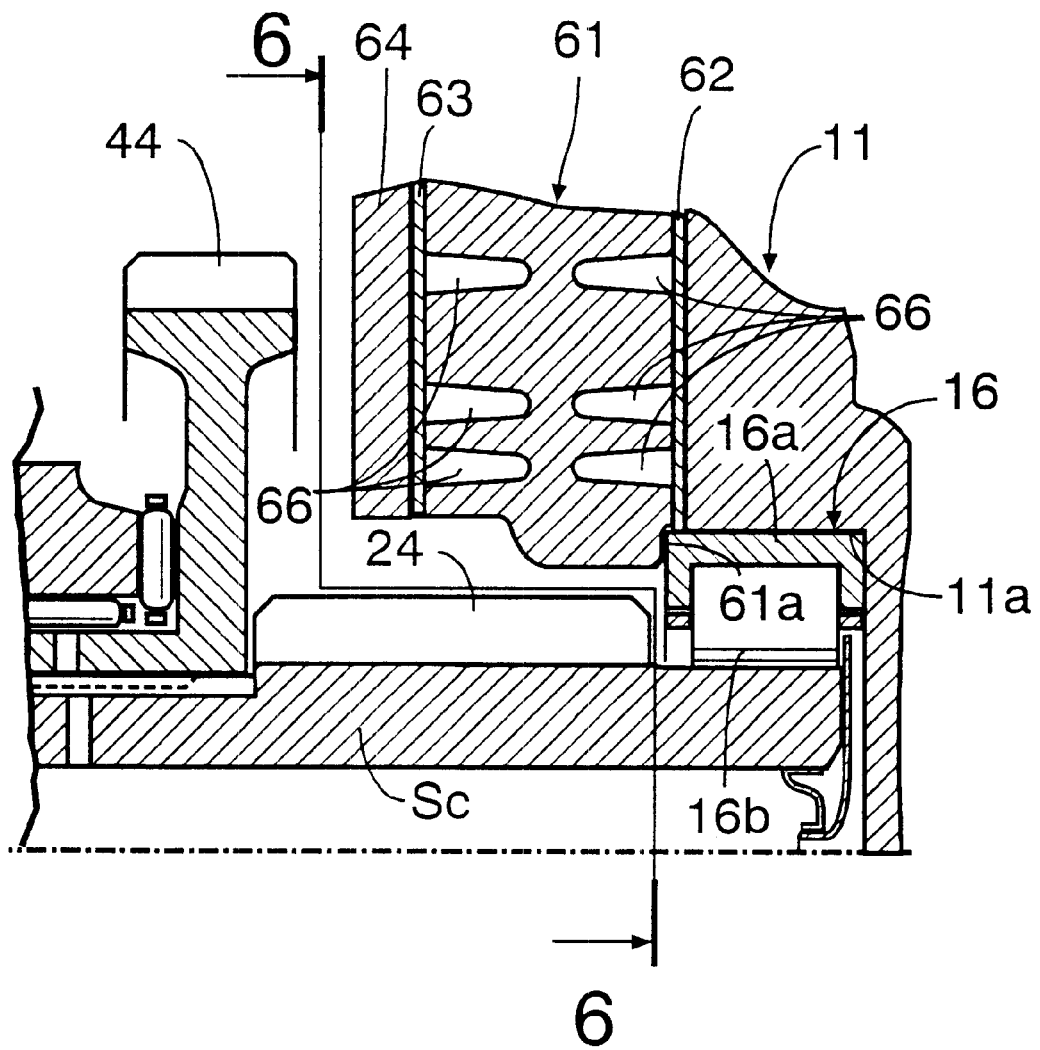
Figure 6:
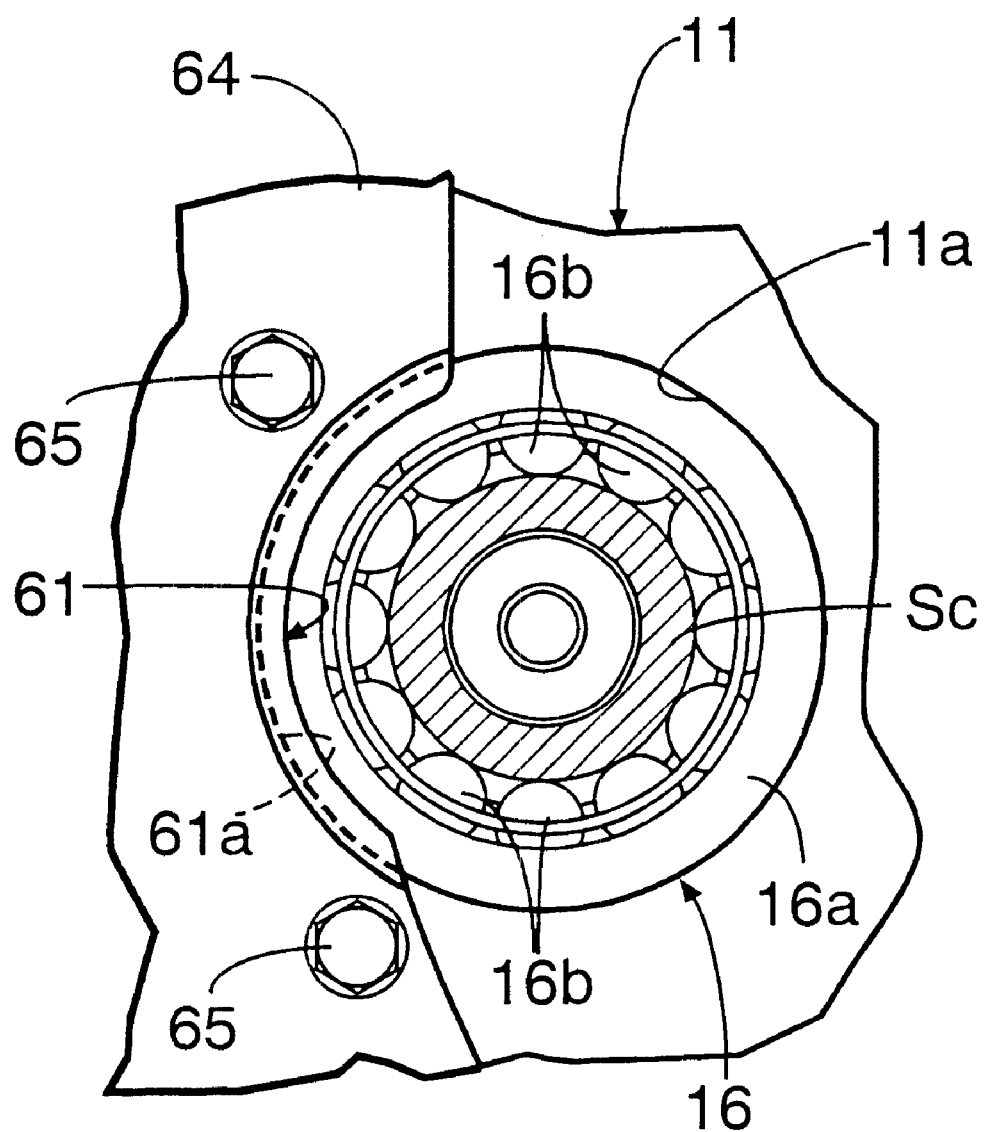
Figure 7:
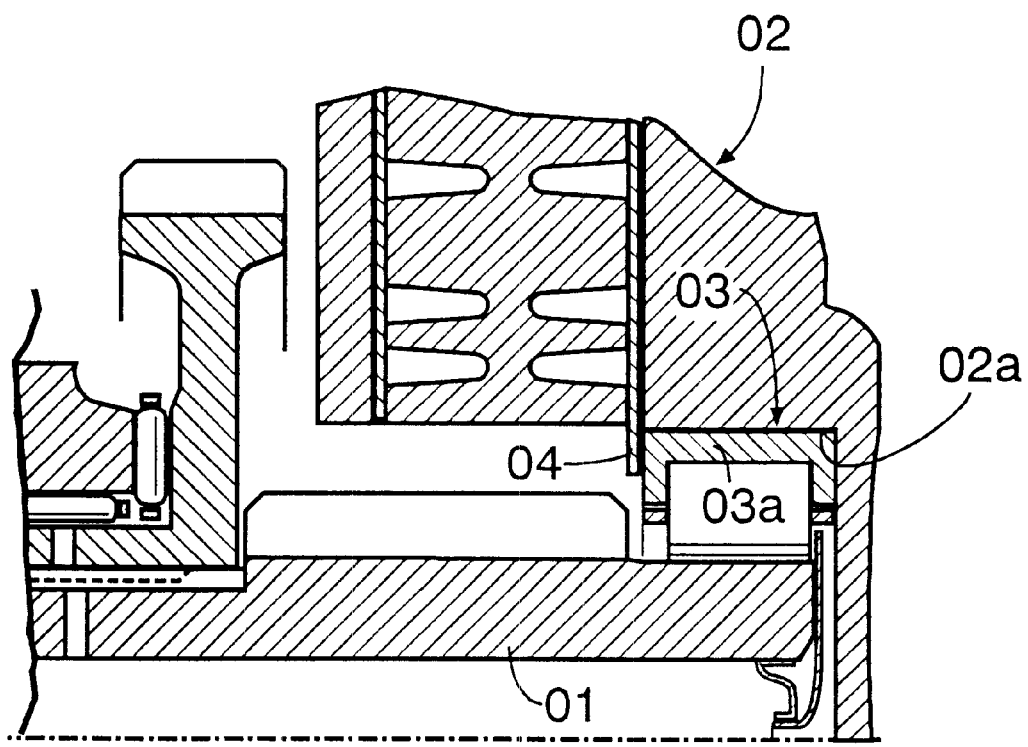
FIG. 7 is a diagram showing a conventional mounting structure for a bearing.

As is clear from FIGS. 5 and 6, the roller bearing 16 supporting the right end of the counter shaft Sc comprises a plurality of rollers 16b supported within an annular housing 16a having a U-shaped cross-section. The above-mentioned housing 16a is press-fitted in the recess 11a formed in the torque converter case 11. The left end of the housing 16a of the large-sized and large-capacity roller bearing 16 protrudes from the left-hand side face of the torque converter case 11 into the interior of the transmission case 12. Superimposed on the left-hand side face of the torque converter case 11 are a first separator plate 62, a valve body 61, a second separator plate 63 and a cover plate 64 and they are fastened together by a plurality of bolts 65. Formed on both sides of the valve body 61, which are in contact with the first and second separator plates 62 and 63, are oil passages 66 of a hydraulic control system. The edge of the first separator plate 62 that is made in the form of an arc abuts the outer periphery of the housing 16a of the roller bearing 16. An arc-shaped notch 61a formed on the surface of the end of the valve body 61 on the torque converter case 11 side is in contact with the left-hand side face of the housing 16a of the roller bearing 16. The edge of the first separator plate 62 can be in contact with the outer periphery of the housing 16a or can be separated from the outer periphery of the housing 16a by a gap.

As described above, since the housing 16a of the roller bearing 16 is held in, not by the first separator plate 62, but by the notch 61a of the valve body 61, it is possible to reliably support the counter shaft Sc by increasing the dimensions of the roller bearing 16 without increasing the dimensions of the torque converter case 11 or greatly changing the first separator plate 62 and the valve body 61.

An embodiment of the invention has been described in detail above, but the present invention can be modified in a variety of ways without departing from the spirit and scope of the invention.

For example, the present invention can be applied to a bearing that supports a shaft other than the counter shaft Sc. Furthermore, the present invention can be applied to any bearing other than the roller bearing 16.

As hereinbefore described, in accordance with the present invention, when the bearing having a large axial dimension is press-fitted in the recess of the torque converter case, even if the housing of the bearing protrudes from the recess, since the edge of the separator plate is in contact with the outer periphery of the housing of the bearing and the notch formed on the valve body superimposed on the separator plate is in contact with the end face of the housing of the bearing, the valve body can reliably prevent the bearing from falling out while forming the oil passage by interposing the separator plate between the torque converter case and the valve body.

What is claimed is:

1. A vehicle transmission, comprising:
   an oil passage formed by interposing a separator plate between a torque converter case and a valve body;
   a bearing that supports a shaft press-fitted in a recess of the torque converter case;
   and a housing of the bearing held in place by an edge of the separator plate abutting an outer periphery of the housing of the bearing;
   and a notch formed on the valve body superimposed on the separator plate and contacting an end face of the housing of the bearing.

2. A vehicle transmission, comprising:
   a valve body having a notch;
   a torque converter case having a recess;
   a separator plate interposed between the valve body and the torque converter case; and
   a bearing having a housing disposed in the recess of the torque converter case and held in place by the notch contacting an end face of the housing.

3. A vehicle transmission according to claim 2, wherein the separator plate has an edge abutting an outer periphery of the housing of the bearing.

4. A vehicle transmission according to claim 2, wherein the separator plate has an arc-shaped edge abutting an outer periphery of the housing of the bearing.

5. A vehicle transmission according to claim 2, wherein the notch is arc-shaped.

6. A vehicle transmission according to claim 2, wherein the valve body includes an oil passage adjacent the separator plate.

7. A vehicle transmission according to claim 2, wherein the bearing supports a shaft.

* * * * *